United States Patent [19]
Homolka

[11] 3,855,845
[45] Dec. 24, 1974

[54] GAS SPECIFIC GRAVITY METER
[75] Inventor: George A. J. Homolka, Ft. Worth, Tex.
[73] Assignee: Texaco Inc., New York, N.Y.
[22] Filed: Dec. 15, 1972
[21] Appl. No.: 315,376

[52] U.S. Cl. .................................................. 73/30
[51] Int. Cl. ............................................. G01h 9/26
[58] Field of Search ............................... 73/30, 438

[56] References Cited
UNITED STATES PATENTS
| | | | |
|---|---|---|---|
| 1,052,412 | 2/1913 | Eynon | 73/30 |
| 1,527,721 | 2/1925 | Willey | 73/30 |
| 3,417,607 | 12/1968 | Johnson | 73/30 |
| 3,473,046 | 10/1969 | Wonson | 73/398 |
| 3,554,010 | 1/1971 | Der Veen et al. | 73/438 |
| 3,589,200 | 6/1971 | Nilsson | 73/438 |
| 3,667,293 | 6/1972 | Moore | 73/398 |

Primary Examiner—Herbert Goldstein
Attorney, Agent, or Firm—T. H. Whaley; C. G. Ries

[57] ABSTRACT

A specific gravity meter for measuring an unknown gas against a known gas such as helium. There are equal height columns of the gases with pressure transducers located at the tops and bottoms of the columns. The transducers measure the pressure differentials between columns at the vertically spaced location, and there is an electrical system for determining the difference between those pressure differentials. The difference determination may be calibrated in terms of specific gravity of the unknown gas.

9 Claims, 5 Drawing Figures

GAS SPECIFIC GRAVITY METER

BACKGROUND OF THE INVENTION

1. Field of the Invention

This invention concerns apparatus for measuring specific gravity, and particularly for making a measurement of the specific gravity of a gas. It is particularly applicable to the measurement of specific gravity of natural gas.

2. Description of the Prior Art

Heretofore, instruments that have been available for measuring specific gravity of gases, such as natural gas, included those that operate on the buoyancy principle as well as other principles. However, all such known instruments are quite expensive and/or the accuracy leaves room for improvement. In addition, the more accurate of such instruments have been delicate in nature and have required careful calibrations and maintenance in order to provide the required accuracy.

Therefore, it is an object of this invention to provide a simplified and rugged instrument for making gas-type specific gravity measurements. Also, it is an object to provide an instrument that is at the same time highly accurate.

SUMMARY OF THE INVENTION

Briefly, the invention concerns a gas specific gravity meter which comprises in combination a column of gas to be measured, and a column of standard gas. It also comprises a first means for measuring the pressure difference between said columns near the tops thereof, and second means for measuring the pressure difference between said columns at a location vertically displaced a predetermined distance beneath said first means. It also comprises means for determining the difference between said pressure-difference measurements.

Again, briefly, the invention concerns a gas-type specific gravity meter which comprises in combination a column of natural gas to be measured, and a column of helium gas. It also comprises a first pressure transducer interconnecting said gas columns at the tops thereof, and a second pressure transducer interconnecting said gas columns at a predetermined vertical distance beneath said first pressure transducer. The said pressure transducers each comprising a silicon NPN planar transistor having the emitter-base junction thereof mechanically coupled to a diaphragm. The meter also comprises a bellows connected to said helium-gas column at the top thereof and having a volume that is large compared to the volume of said column, and first circuit means for connecting a DC power supply to said transistor. The said circuit means comprises a resistance network interconnecting each of said transistors with said power supply, and each of said networks comprises means for applying a predetermined voltage signal to the base-emitter junction of said transistor and for providing an output-voltage signal depending upon the current flow through the collector-emitter circuit of said transistor. The latter also comprises second circuit means for determining the difference between said output-voltage signals, and each of said resistance networks also comprises a thermistor located adjacent to said pressure transducer for providing temperature compensation.

DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein.

DESCRIPTION OF THE PREFERRED EMBODIMENT

Figure 1:
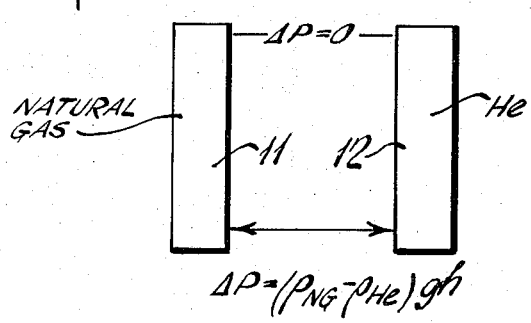
FIG. 1 is a schematic diagram indicating the theoretical basis for the apparatus according to the invention.

FIG. 1 illustrates the theory behind apparatus in accordance with this invention. There is illustrated a column 11 of an unknown gas, e.g. natural gas, as indicated by the caption. And there is another similar column 12 containing helium or some other known gas. The hydrostatic pressure due to a column of liquid or gas may be expressed in the following form:

$$\rho g h \quad (1)$$

where $\rho$ = density of the fluid, $g$ = acceleration due to gravity, and $h$ = height of the column of fluid.

If there are two columns of the same height ($h$) which contain two fluids having different densities, $\rho_1$ and $\rho_2$, respectively, the differential pressure at the bottom of these columns may be expressed in the following form:

$$gh(\rho_1 - \rho_2) = \Delta P \quad (2)$$

where $\Delta P$ = the differential pressure at the bottom of the columns.

In the illustrated case (FIG. 1) the two fluids are natural gas and helium, and the pressures of each are adjusted so that the differential pressure between the columns when taken at the top, is zero. This is indicated by the caption "$\Delta P = 0$". Then, as indicated in the drawing also, the difference of pressure at the bottoms of the two columns 11 and 12 will be due to the hydrostatic pressures of the two gases. Consequently, the expression for this difference is shown by the equation indicated as a caption, i.e.:

$$\Delta P = (\rho_{NG} - \rho_{He}) gh \quad (3)$$

Figure 2:
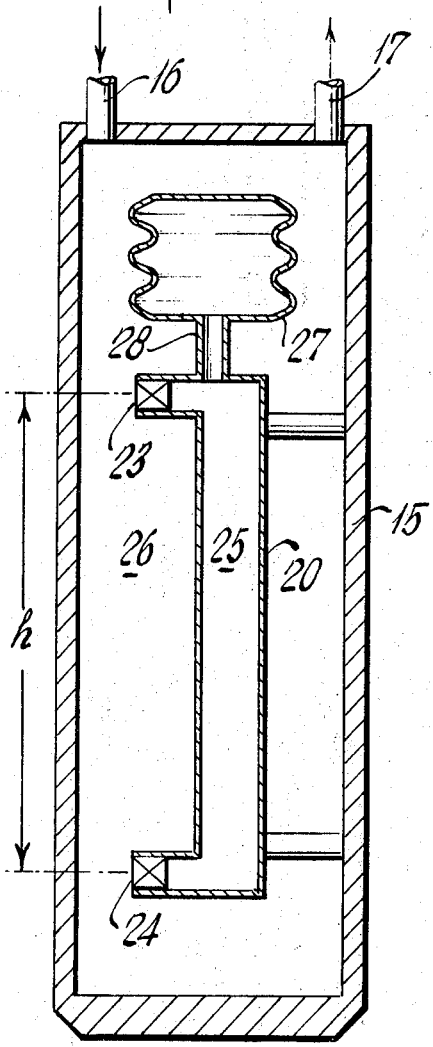
FIG. 2 is a schematic cross-sectional view of an instrument in accordance with the invention.

FIG. 2 is a schematic illustration showing the mechanical structure of a meter according to the invention. There is casing, or pressure vessel 15 which has an inlet pipe 16 and an outlet pipe 17. The two pipes are for permitting circulation of natural gas into, and out of, the interior of the casing 15.

Mounted inside of the casing 15, there is a sealed manifold 20 that contains a known gas, e.g., helium therein. This manifold may take the form of a relatively small-diameter tube that forms a column of the helium gas. This column has a vertical height $h$, as indicated by the caption on FIG. 2. Such column height may vary depending upon the accuracy desired. However, it is contemplated that for the illustrated meter using helium gas, it would be in the order of thirty inches. This height is measured between a pair of pressure transducers 23 and 24. These transducers are schematically indicated in FIG. 2, and it will be noted that they are each in contact with the helium on one side thereof and with the natural gas inside of casing 15 on the other side. Consequently, these transducers measure the pressure differences between two columns of helium gas 25 and natural gas 26 at each of the vertically spaced locations.

In order to have the pressure difference between the tops of the gas columns 25 and 26 as near zero as possible, there is a bellows 27 that has the interior thereof connected by an open tube, or pipe 28 to the interior of the tubular manifold 20 at the top thereof.

While the schematic showing in FIG. 2 does not make it clear, it is to be noted that the interior volume of bellows 27 will be large with respect to the volume of gas in the column 25 of helium inside the manifold 20. In this manner the pressure indicated by transducer 23 will be close to zero. Under these conditions the pressure indicated by the lower transducer 24 may be represented by the following expression which is in accordance with the theoretical discussion above:

$$\Delta P_{24} = \Delta P_{23} + (\rho_{NG} - \rho_{He}) gh$$

(4)

where $\Delta P_{24}$ = the pressure difference at the bottoms of gas columns 25 and 26; $\Delta P_{23}$ = the pressure difference at the tops of the same gas columns 25 and 26; and the other elements are the same as was indicated above in connection with the equations (1), (2), and (3).

Equation (4) may be solved to give the expression for the density of the natural gas:

$$\rho_{NG} = \Delta P_{24} - \Delta P_{23}/gn + \rho_{He}$$

(5)

and it will be understood that the specific gravity of the natural gas is equal to the ratio of the density of the natural gas to the density of air.

Figure 5:
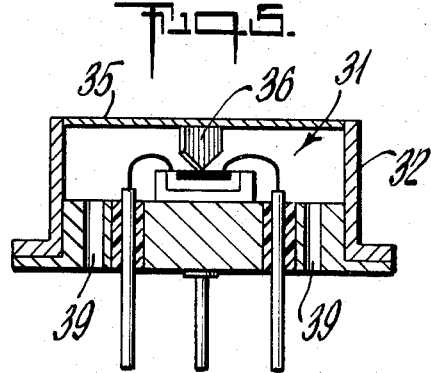
FIG. 5 is a cross-sectional schematic illustration showing the structure of a pressure transducer which may be employed in the system according to the invention.

While pressure transducers 23 and 24 may take various forms so long as they are sufficiently sensitive to provide desired accuracy, it is preferred to employ a particular type of pressure transducer such as one manufactured by Stow Laboratories Inc. of Hudson, Massachusetts, and identified by the trade name PITRAN. Such instrument is illustrated in FIG. 5. It includes a silicon planar transistor 31 that is mounted in a circular housing 32. There is a diaphragm 35 that is supported at its periphery, or outer edges by the housing 32. A stylus 36 is mounted on the diaphragm and has a sharp-edged tip that is in contact with the upper surface of the transistor 31.

The structure of the transducer is such that a differential pressure applied to the diaphragm 35 will produce a large reversible change in the gain of the transistor 31. It will be observed that there are a plurality of pressure ports 39 which connect the space beneath diaphragm 35 with the outside of housing 32 at the bottom of the transducer. Thus, it will be understood that the transducer will be mounted so that separate fluid pressures from above and beneath the diaphragm 35 will cause it to tend the flex and so vary the amount of pressure that is applied to the transistor 31 via the stylus 36.

Figure 3:
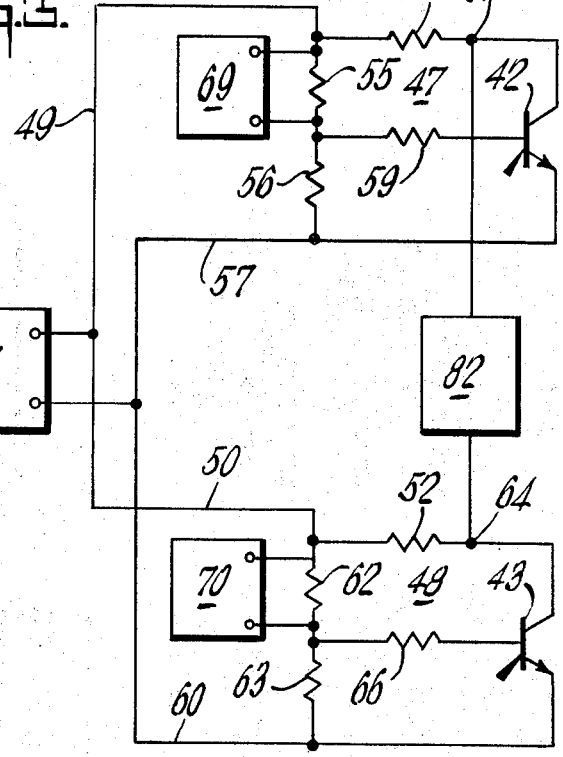
FIG. 3 is a schematic circuit diagram illustrating an electrical circuit which may be employed in connection with the invention.

FIG. 3 illustrates a circuit diagram showing how the transducers are connected to provide the desired indication concerning the difference between pressure differentials at the two locations on the columns of gas. There is a pressure-sensitive transistor 42 which may take the form illustrated in FIG. 5 and described above. In FIG. 3, the transistor 42 corresponds to transducer 23 of FIG. 2. Similarly, there is another pressure-sensitive transistor 43 (FIG. 3) which corresponds to the transducer 24 of FIG. 2.

It will be appreciated that the transducers 23 and 24 of FIG. 2 will be mounted so that one side of the diaphragm of each is exposed to the natural gas column 26 while the other sides of the diaphragms are exposed to the helium column 25. Therefore, each transducer 23 and 24 will measure the pressure difference between the two columns, and at a vertically spaced-apart distance $h$, as indicated. Furthermore, the measurement at transducer 23 will be close to zero because of the bellows 27, as described above.

There is a DC power supply 46 that is connected in parallel to each of two resistance networks 47 and 48. These networks 47 and 48 supply voltages to the transistors 42 and 43, respectively. There is a circuit connection 49 to apply one side of the DC voltage from power supply 46 to the collector of the transistor 42 via a resistor 51. And, similarly, there is another circuit connection 50 that applies the same side of the power supply 46 to another resistor 52 for supplying the collector of the other transistor 43.

In the resistance network 47, there is a series pair of resistors 55 and 56 which are connected across the power supply via the circuit connection 49 and a return connection 57. This creates a potentiometer, and the network 47 includes another resistor 59 that is connected between the base electrode of transistor 42 and the mid-point between the resistors 55 and 56.

The other network 48 is similar to network 47 and has corresponding series resistors 62 and 63 that are connected across the power supply 46 via the connection 50 and back over a circuit connection 60 to the other side of the supply. Also, there is resistor 66 that connects the base electrode of transistor 43 to the midpoint between the series resistors 62 and 63.

It will be understood that these networks provide an arrangement such that the pressure difference applied to each transducer will produce a voltage-output signal that is directly related thereto. For example, the voltage at a point 61 in the network 47 will be a signal that is directly related to the pressure difference of the helium in column 25 at the top (transducer 23), and the natural gas in column 26 at the top (other side of transducer 23). Similarly, there is another point 64 which is in the other network 48, and at which point there will be another signal. This signal is directly related to the pressure difference of the helium in column 25 at a location (transducer 24) that is vertically displaced a distance $h$ beneath the top of the column, and the pressure of the natural gas in column 26 at the other side of the diaphragm of the transducer 24.

The resistance networks each also include a temperature-compensating element. Thus, there are temperature-compensation units 69 and 70 that are connected across, i.e., in parallel with the resistor 55 of network 47, and the resistor 62 of network 48, respectively. Each of these temperature-compensating units may be the same, and the details of one such element are illustrated in FIG. 4.

Figure 4:
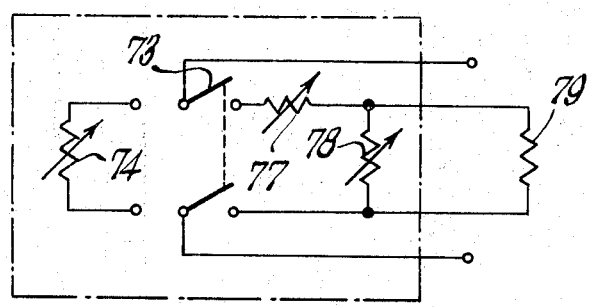
FIG. 4 is a schematic circuit diagram illustrating the details of one of the temperature-compensating elements shown in FIG. 3.

FIG. 4 illustrates details of a temperature-compensating unit that may be used with the resistance networks of the FIG. 3 system. There is a double-pole doublethrow switch 73 that may be alternatively positioned to connect either a single thermistor element 74 or a network which includes two thermistors 77 and 78 in addition to a resistor 79. In either case, since the thermistors are temperature-sensitive, they will act to automatically adjust the resistance of the upper half of the potentiometers that apply control voltages to the bases of the transistors. Consequently, this will provide a temperature compensation which depends upon temperature at the locations where the thermistors are placed. By using the selectivity of the double-pole double-throw switches, there may be a temperature compensation provided using a single thermistor 74 at each transducer location. Or, there may be a pair of thermistors 77 and 78 with one located adjacent to each of the two transducers 23 and 24. Of course, the resistance values would be adjusted accordingly.

Returning to FIG. 3, there is a voltmeter 82 which is connected between the pressure-difference-signal points 61 and 64. It will be noted that this supplies an output signal that may be calibrated in terms of the difference between the pressure-differential signals. It will be appreciated that the voltmeter 82 might also be a recorder if it is desired to maintain a record of the continuous output signals from the system. The calibration may be such that the output signal is a direct reading of the specific gravity of the natural gas in the column 26.

While a particular embodiment of the invention has been describe above in considerable detail in accordance with the applicable statutes, this is not to be taken as in any way limiting the invention but merely as being descriptive thereof.

I claim:

1. A meter for measuring specific gravity of gas, comprising in combination
   a first container for holding a column of gas to be measured,
   a second container for holding a column of standard gas,
   means subjected to the pressure of said columns near the tops thereof for equalizing most of the pressure difference thereat, comprising a bellows connected to said standard gas column and having a volume that is large compared to the volume of the column,
   first electronic means for measuring the pressure difference of said columns of gas near said tops thereof,
   second electronic means for measuring the pressure difference of said columns of gas at a location vertically displaced a predetermined distance beneath said electronic means, and
   electrical means for determining the difference between said pressure difference measurements.

2. A gas specific gravity meter according to claim 1, wherein
   said electronic means for measuring the pressure differences comprises planar transistors.

3. A gas specific gravity meter according to claim 2, wherein
   said means for determining the difference between said pressure-difference measurements comprises electric circuit means.

4. A gas specific gravity meter according to claim 3, wherein
   said electric circuit means comprises a pair of resistance networks.

5. A gas specific gravity meter according to claim 4, wherein
   each of said pair of resistance networks comprises temperature-responsive means for compensating for ambient temperature changes at each of said planar transistors.

6. A gas specific gravity meter according to claim 5, wherein
   said temperature-responsive means comprises a thermistor.

7. A gas-type specific gravity meter, comprising in combination
   a column of natural gas to be measured,
   a column of helium gas,
   a first pressure transducer interconnecting said gas columns at the tops thereof,
   a second pressure transducer interconnecting said gas columns at a predetermined vertical distance beneath said first pressure transducer,
   said pressure transducers each comprising a silicon NPN planar transistor having the emitter-base junction thereof mechanically coupled to a diaphragm,
   a bellows connected to said helium gas column at the top thereof and having a volume that is large compared to the volume of said column,
   first circuit means for connecting a DC power supply to said transistors,
   said circuit means comprising a resistance network interconnecting each of said transistors with said power supply,
   each of said networks comprising means for applying a predetermined voltage signal to the base-emitter junction of said transistor and for providing an output-voltage signal depending upon the current flow through the collector-emitter circuit of said transistor, and
   second circuit means for determining the difference between said output-voltage signals,
   each of said resistance networks also comprising a thermistor located adjacent to said pressure transducer for providing temperature compensation.

8. A gas-type specific gravity meter according to claim 7, wherein
   said second circuit means comprises a DC voltmeter.

9. A gas-type specific gravity meter according to claim 7, wherein
   said second circuit means comprises a recorder.

* * * * *